(12) United States Patent
Resnick et al.

(10) Patent No.: US 6,529,928 B1
(45) Date of Patent: Mar. 4, 2003

(54) FLOATING-POINT ADDER PERFORMING FLOATING-POINT AND INTEGER OPERATIONS

(75) Inventors: David R. Resnick, Eau Claire, WI (US); William T. Moore, Elk Mound, WI (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/274,595

(22) Filed: Mar. 23, 1999

(51) Int. Cl.[7] ............................. G06F 7/42; G06F 7/38
(52) U.S. Cl. ....................................... 708/505; 708/495
(58) Field of Search ................................ 708/505, 495

(56) References Cited

U.S. PATENT DOCUMENTS

| | | | |
|---|---|---|---|
| 5,357,237 A | * 10/1994 | Bearden et al. | ............. 708/505 |
| 5,490,100 A | * 2/1996 | Kableshkov | ................ 708/505 |
| 6,148,316 A | * 11/2000 | Herbert et al. | ............. 708/505 |

* cited by examiner

Primary Examiner—Tan V. Mai
(74) Attorney, Agent, or Firm—Schwegman, Lundberg, Woessner & Kluth, P.A.

(57) ABSTRACT

An apparatus and a method are disclosed for performing both floating-point operations and integer operations utilizing a single functional unit. The floating-point adder performs logic for comparing exponents, logic for selecting and shifting a co-efficient, and logic for adding coefficients. In operation, the floating-point adder unit performs integer addition, subtraction, and compare operations using substantially the same hardware as used for floating-point operations. The output of the logic for comparing exponents represents the most significant bits of the result of the integer operation. The output of the logic for adding co-efficients represents the least significant bits of the result of the integer operation. If there is a carry from the logic for adding co-efficients, the value of the carry is added to the partial result representing the most significant bits of the integer operation. The floating-point adder permits all integer add, subtract and compare operations be performed by the floating-point adder without adding substantial additional hardware to the arithmetic logic unit.

17 Claims, 4 Drawing Sheets

FLOATING-POINT ADDER PERFORMING FLOATING-POINT AND INTEGER OPERATIONS

FIELD OF THE INVENTION

The present invention relates generally to processors and more particularly to a floating-point adder unit performing floating-point and integer operations within such processors.

BACKGROUND OF THE INVENTION

Digital devices perform a variety of arithmetic operations on binary numerical data. A processor within such digital devices includes a major subdivision called an arithmetic logic unit (ALU). The ALU performs a variety of data processing and arithmetic operations under the control of the processor. The first processors had only one ALU. Modem chips may have several ALUs that commonly are classed into two types. One basic type of ALU is an integer unit which carries out simple integer mathematical operations including add, subtract, multiply, shift and logical instructions. More powerful processors also include a second type of ALU, referred to as a floating-point unit, that handles advanced math operations on numbers with a wider range than simple integers (such as $1.03 \times 10^{-19}$ for example.) Floating-point units use separate, dedicated instructions for their advanced functions.

Devices that process both floating point and integer operations commonly have both a floating-point unit and an integer unit for performing arithmetic operations. However, it is often undesirable to add additional hardware such as a separate integer adder in order to implement the arithmetic operations for integer operands. What is needed is an apparatus for and method of performing arithmetic integer operations without requiring separate integer and floating-point hardware.

SUMMARY DESCRIPTION OF THE DRAWINGS

A floating-point adder unit performing both floating-point operations and integer operations adds functionality without adding substantial additional hardware to the ALU.

One aspect of the floating-point adder unit comprises logic for comparing exponents, logic for selecting and shifting a co-efficient, and logic for adding coefficients. In operation, the floating-point adder unit performs integer addition, subtraction, and compare operations using substantially the same hardware as used for floating-point operations. The output of the logic for comparing exponents represents the most significant bits of the result of the integer operation. The output of the logic for adding coefficients represents the least significant bits of the result of the integer operation. If there is a carry from the logic for adding coefficients, the value of the carry is added to the partial result representing the most significant bits of the integer operation.

The present invention performs both floating-point and integer operations utilizing the floating-point adder. The floating-point adder desirably permits all floating-point and integer add, subtract and compare operations to be performed without adding substantial additional hardware to the ALU for the integer operations. Thus, the floating-point adder permits execution of all floating-point and integer operations utilizing one functional unit.

Still other and further embodiments, aspects and advantages of the invention will become apparent by reference to the drawings and by reading the following detailed description.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present inventions. The following detailed description is, therefore, not to be taken in a limiting sense, and the scope of the present inventions is defined only by the appended claims. Signals and connections may be referred to by the same reference number or label, and the actual meaning will be clear from its use in the context of the description.

Figure 1:
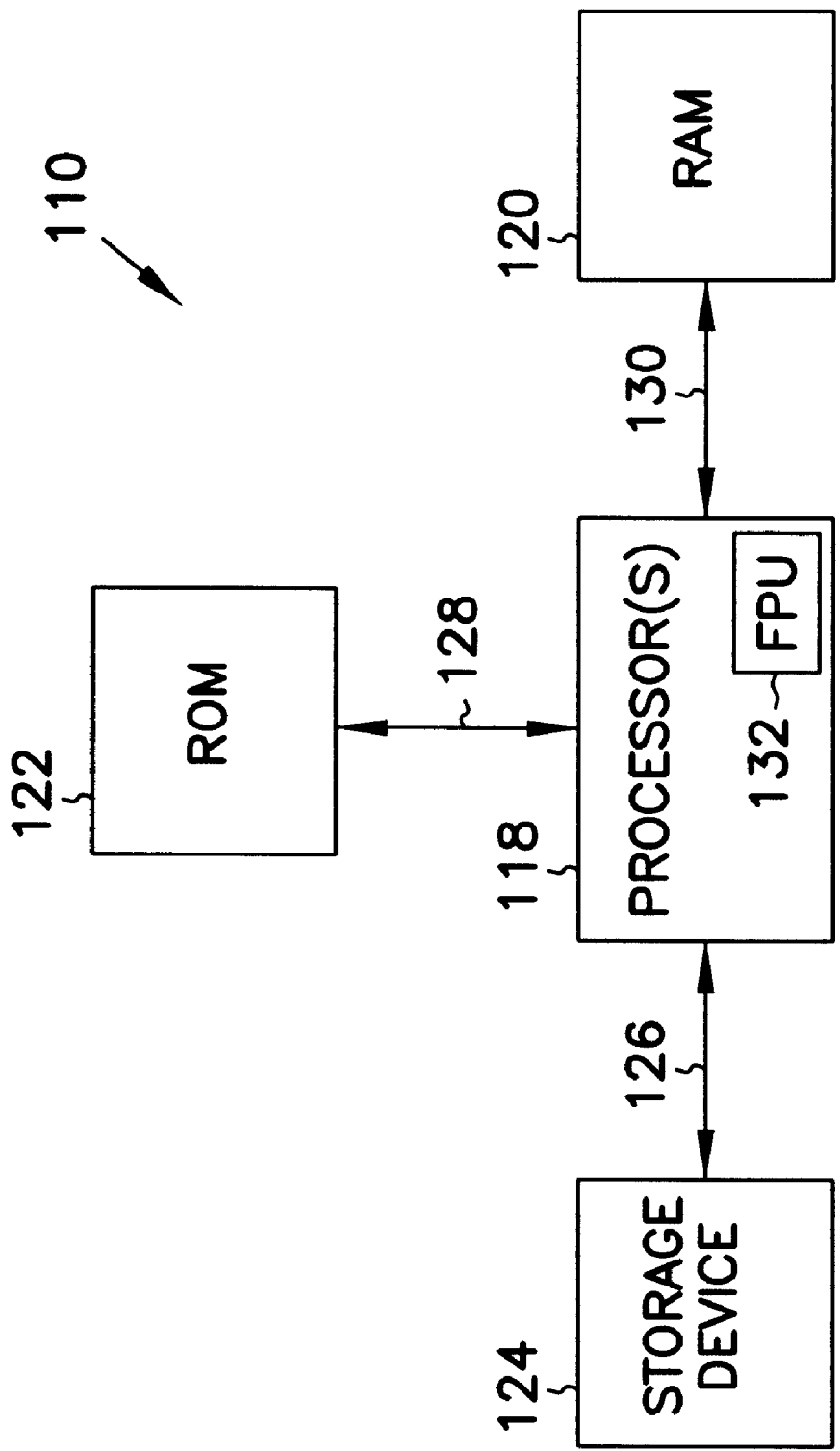
FIG. 1 is a diagram of a computerized system in conjunction with which embodiments of the invention may be implemented.

Overview. In this section of the detailed description, an overview of a computerized system and a processor in conjunction with which example embodiments of the invention may be practiced is given. Referring first to FIG. 1, a diagram of a computerized system in conjunction with which example embodiments of the invention may be implemented is shown. Computer 110 includes one or more processors 118, random-access memory (RAM) 120, read-only memory (ROM) 122, and one or more storage devices 124, such as a hard disk drive, a floppy disk drive (into which a floppy disk can be inserted), an optical disk drive, a tape cartridge drive and the like. RAM 120 and ROM 122 are collectively referred to as the memory of computer 110. The memory, hard drives, floppy disks, and the like, are types of computer-readable media. The computer-readable media store floating-point and integer instructions and data for execution by the processor 118. The instructions are provided to the processor 118 over a bus 126, 128, 130.

The invention is not particularly limited to any type of computer 110. The construction and operation of such computers are well known within the art.

Processor 118 of computer 110 has a floating-point adder (FPU) 132 which in one embodiment conforms to the IEEE standard for binary floating point arithmetic operations. The floating-point adder performs all of the operations mandated by the IEEE standard including all of the compare operations. In addition, all integer operations can be performed using the floating-point adder. The integer operations include add and subtract functions and the complete set of IEEE compare instructions. However, the invention is not limited to the IEEE floating-point standard. Those skilled in the art will recognize that other comparable floating-point representations may be employed with the floating-point adder 132 without diverting from the scope of the present invention. In addition, those skilled in the art will recognize that the invention is not limited to a computer and that the floating-point adder 132 can be employed in any digital device which performs floating-point operations without diverting from the scope of the present invention. For example, the floating-point adder 132 can be employed in any digital device ranging from a single chip system to a supercomputer.

Figure 2A:
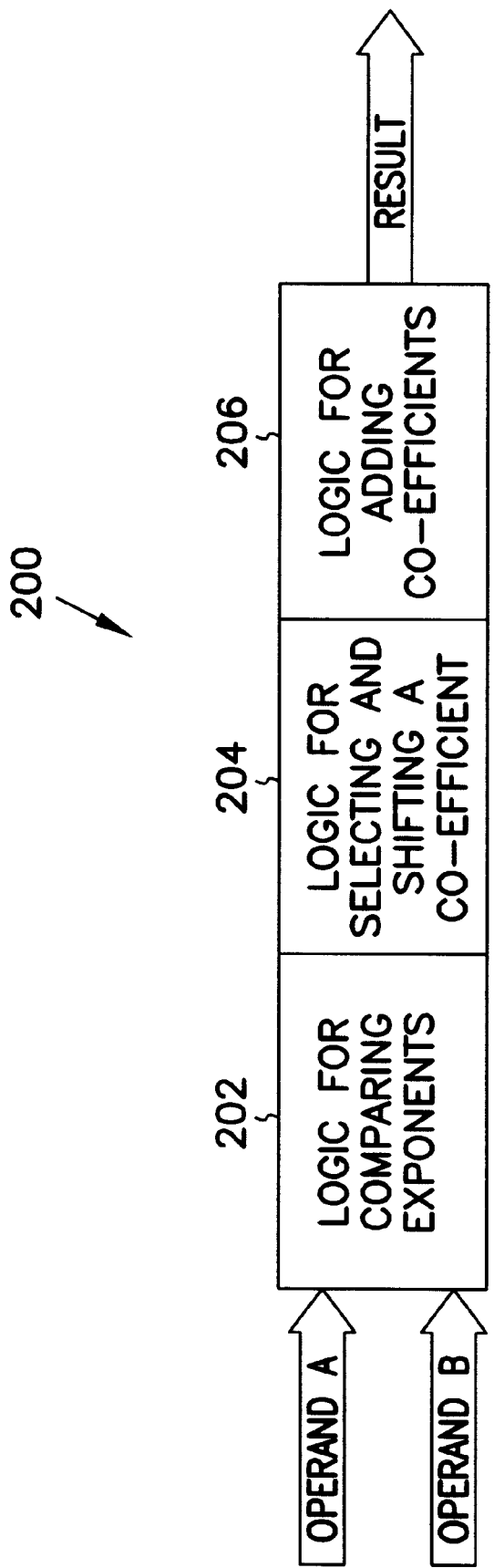
FIG. 2A is a high level block diagram of a floating-point adder for performing floating-point operations.

Floating-Point Adder. FIG. 2A is a high level block diagram of one embodiment of a floating-point adder 200 for performing floating-point operations. The floating-point adder 200 performs addition, subtraction and compare operations for instructions having floating-point operands. Floating-point operations require that the operands have the same exponents. Before performing an operation on floating-point operands, the exponents of the operands are compared to determine if the exponents have the same value. If the compare result indicates that the operands have exponents of different values, the co-efficient of the operand with the smaller exponent is shifted and the exponent adjusted so that the operands have the same exponents.

The floating-point adder 200 shown in FIG. 2A comprises logic for comparing exponents 202, logic for selecting and shifting a co-efficient 204, and logic for adding co-efficients 206. To perform an arithmetic operation on two floating-point operands with the floating-point adder 200, the logic for comparing exponents 202 compares the exponents of the operands to determine if the exponents have the same values. If the exponents have different values, then the logic for selecting and shifting the co-efficient 204 shifts one of the operands and adjusts the corresponding exponent so that the exponents of the two operands have the same value. The logic for adding coefficients 206 adds the co-efficients of the two operands to produce a co-efficient portion of a result to the arithmetic operation. The co-efficient portion of the result may have leading zero bits that need to be removed to return a proper floating-point result. In such cases, the co-efficient of the result is adjusted to remove the leading zero bits and information is sent to the exponent logic to adjust the exponent of the result as needed.

Figure 2B:
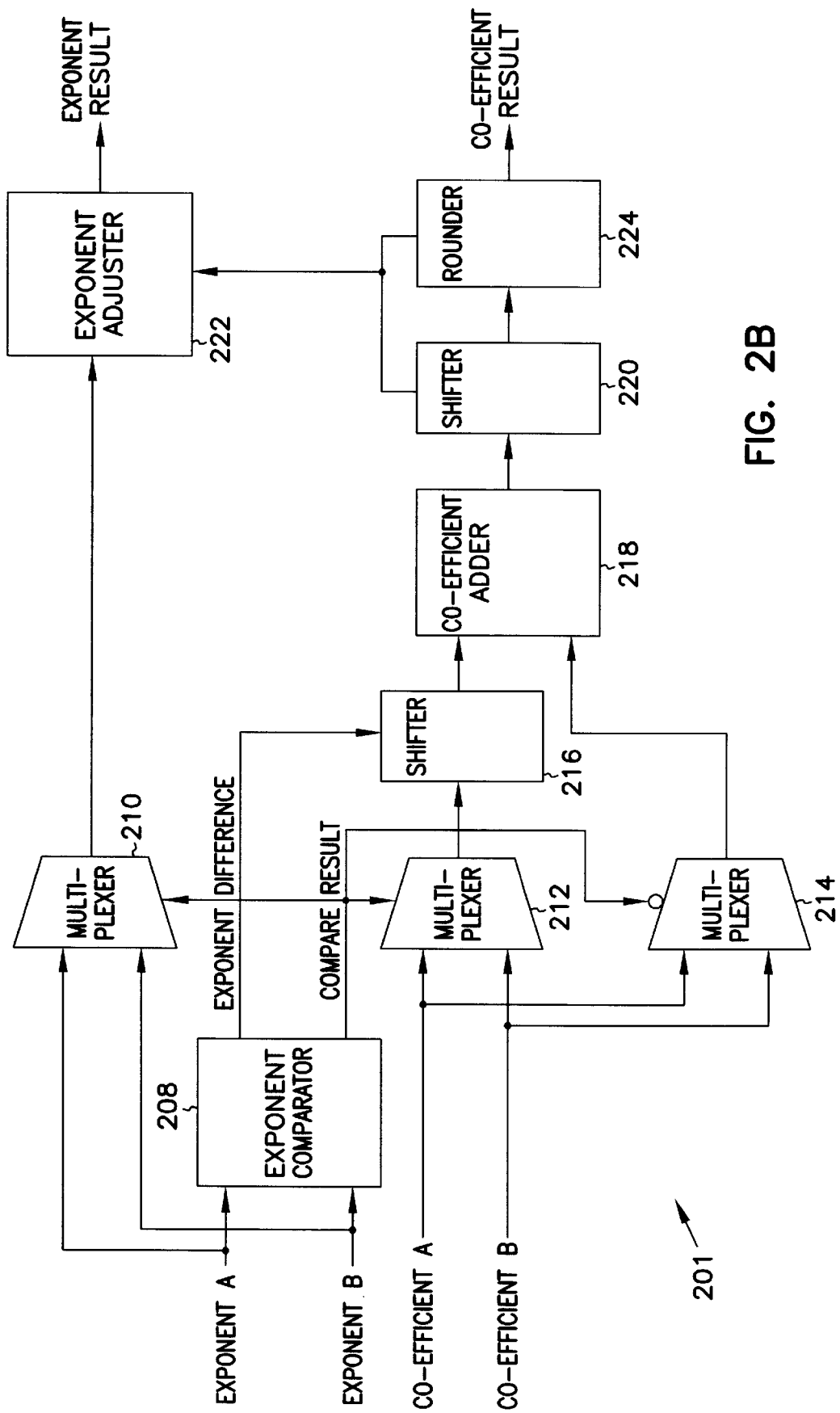
FIG. 2B is more detailed a block diagram of a floating-point adder for performing floating-point operations.

FIG. 2B is a more detailed block diagram of an example embodiment of a floating-point adder 201. In the example embodiment shown in FIG. 2B, an exponent comparator 208 and a first multiplexer 210 receive a plurality of binary bits representing the exponent of a first and a second floating-point operand. A second multiplexer 212 and a third multiplexer 214 receive a plurality of binary bits representing the co-efficient of the first and the second floating-point operand. The exponent comparator 208 calculates an exponent difference and a compare result. A signal on a first output of the exponent comparator 208 represents the compare result and the signal is coupled to a select input of the second multiplexer 212. The compare result is utilized by the second multiplexer 212 to select the co-efficient to be shifted. The co-efficient to be shifted is selected by the second multiplexer 212 and is shifted by a first shifter 216 by a number of positions corresponding to the exponent difference supplied by a second output of exponent comparator 208. The compare result signal on the first output of the exponent comparator 208 is also inverted and coupled to a select input of the third multiplexer 214. The inverted compare result signal is utilized by the third multiplexer 214 to select the opposite co-efficient of the co-efficient selected by the second multiplexer 212. A co-efficient adder 218 adds a shifted co-efficient received from the first shifter 216 to the opposite co-efficient received from the third multiplexer 214. The compare result signal on the first output of the exponent comparator 208 is also coupled to a select input of the first multiplexer 210. The exponent of the result of the operation is selected by the first multiplexer 210.

In some cases, the upper result bits of the add operation performed by the co-efficient adder 218 are zeros. Since it is common for a floating-point representation to try to preserve maximum precision, the co-efficient may be shifted to remove the leading zeros. A second shifter 220 counts the number of leading zeros and the co-efficient is shifted by a number of places equal to the count of the number of leading zeros. Because the shift operation performed by the second shifter 220 changes the significance of the co-efficient, the exponent is adjusted by an exponent adjuster 222. The exponent adjuster 222 subtracts the count of the number of leading zeros from the exponent.

According to some floating-point standards, a final operation is to round the floating-point co-efficient using a rounder 224. If the round operation performed by the rounder 224 results in a 'carry' from the top of the co-efficient, the co-efficient is right shifted by one using rounder 224 and one is subtracted from the exponent using the exponent adjuster 222. The output of the rounder 224 represents the co-efficient of the result. The output of the exponent adjuster 222 represents the exponent of the result.

For floating point operations performed by one embodiment of the floating-point adder 201, the exponent and the co-efficient are represented by a binary number in IEEE floating-point format. The IEEE floating-point format is well-known to those of ordinary skill in the art and is described in detail in IEEE Standard Number 754-1985. The IEEE standard 64-bit double precision format used with one embodiment of the present invention consists of a 64-bit word comprising one (1) sign bit, eleven (11) exponent bits and fifty-two (52) significand bits (referred to herein as co-efficient bits). However, the invention is not limited to 64-bit operands. Alternate embodiments that perform operations on different size operands and on different floating-point formats are contemplated and within the scope of the invention.

Those skilled in the art will also recognize that additional or differing hardware may be employed with the floating-point adder without diverting from the scope of the present invention. For example, in an alternate embodiment the floating-point adder 201 includes an operand register consisting of a set of latches for receiving and storing a first operand and a second operand. In one embodiment, the operand register comprises an exponent register and a co-efficient register. In another example embodiment, the floating-point adder 201 includes overflow detection logic and logic to recognize special values such as infinity, denormalized numbers, and NaNs (Not a Number).

Floating-Point Adder Performing Integer Operations. To perform arithmetic operations on integer operands, the floating-point adder performs the arithmetic operation on the least significant bits of the integer operands using the logic for selecting and shifting a co-efficient and the logic for adding coefficients (referred to herein as "the co-efficient logic"). The floating-point adder performs the arithmetic operation on the most significant bits of the integer operands using the logic for comparing exponents (referred to herein as "the exponent logic"). For example, in one embodiment having sixty-four (64) bit operands, the co-efficient logic operates on the fifty-two (52) least significant bits of the integer operands to generate the least significant bits of an integer result. The exponent logic operates on the twelve (12) most significant bits of the integer operands to generate the most significant bits of the integer result. The value of a carry bit from the least significant bits of the integer result is added to the most significant bits of the integer result. As further described below, a floating-point adder according to the present invention permits execution of floating-point and integer operations utilizing one functional unit without adding substantial additional hardware.

Figure 3:
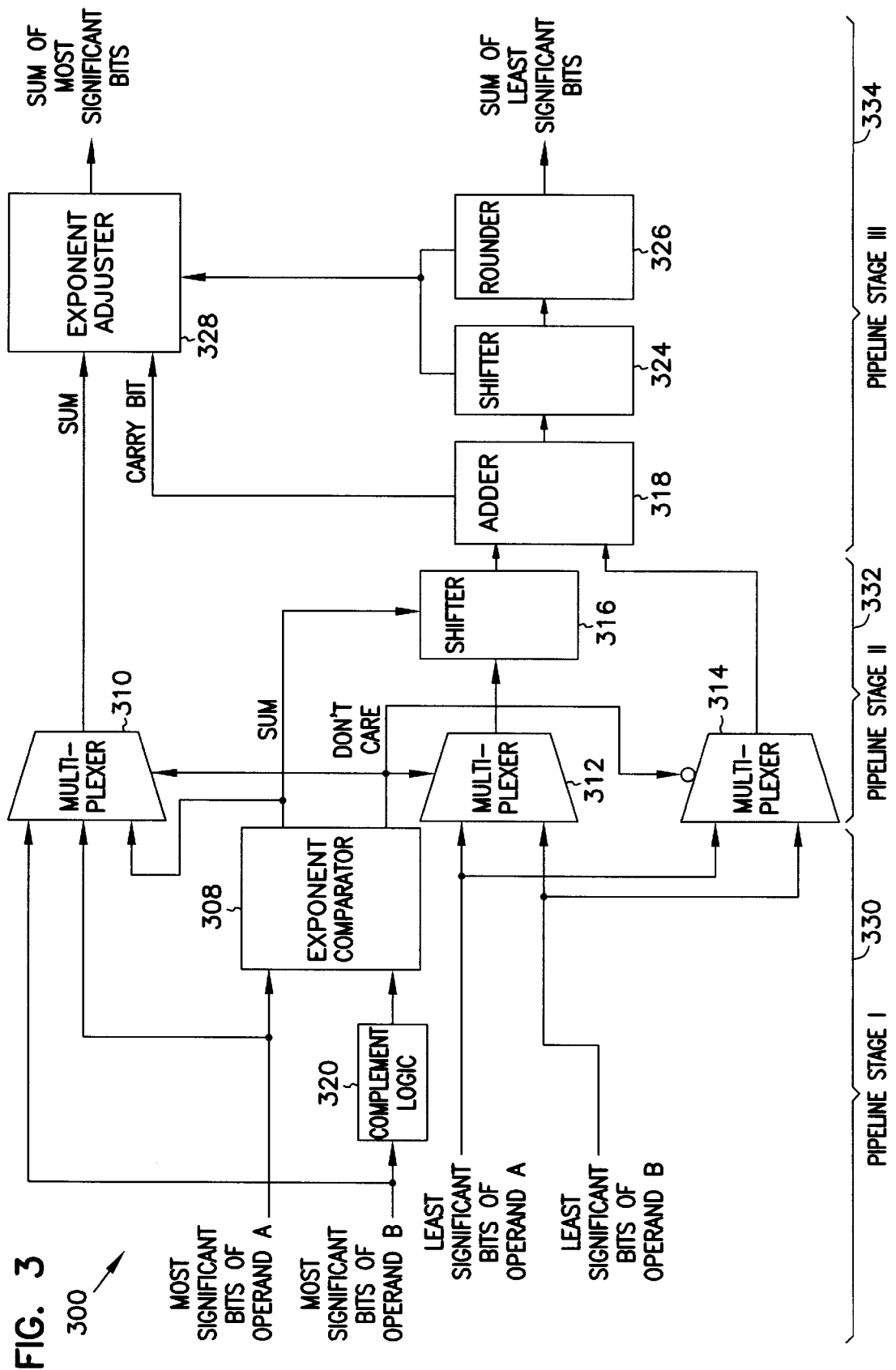
FIG. 3 is a block diagram of one embodiment of a floating-point adder for performing floating-point and integer operations according to the present invention.

FIG. 3 is a block diagram of one embodiment of a floating-point adder 300 for performing floating-point operations and integer operations. The floating-point adder 300 performs addition, subtraction and compare operations for instructions having integer operands in addition to instructions having floating-point operands. To perform floating-point operations, the floating-point adder 300 operates in the same manner as the floating-point adder 201 of FIG. 2B. The floating-point adder 300 also provides a novel mode for performing integer operations (referred to herein as an "integer mode.")

One embodiment of the integer mode is described by reference to the floating-point adder 300 of FIG. 3. In order to use the co-efficient logic of the floating-point adder 300 to operate on the least significant bits of the integer operands, the integer mode sets a second multiplexer 312 to select the least significant bits of one of the operands (for example, operand A). The integer mode also sets a third multiplexer 314 to select the least significant bits of the opposite 10 operand (for example, operand B). Additionally, the integer mode sets the first shifter 316 to shift zero positions. In other words, in the integer mode the least significant bits of one of the integer operands pass through the first shifter 316 without being shifted. Unlike a floating-point operation, during an integer operation the least significant bits are not shifted. The integer mode also turns off the second shifter 324, the rounder 326, and other additional logic in the floating-point adder 300 such as overflow detection logic and logic to recognize special values.

In order to use the exponent logic of the floating point adder 300 to generate the most significant bits of the integer result, the integer mode turns on complement logic 320 to complement the most significant bits of the operand in the subtrahend position (i.e. the number to be subtracted from another). Additionally, the integer mode couples a signal on the first output of exponent comparator 308 to the first multiplexer 310. The signal on the first output of exponent comparator 308 represents the sum of the most significant bits of the integer operands. The integer mode sets the first multiplexer 310 to select the sum of the most significant bits. Also the integer mode couples the carry signal from the adder 318 to the exponent adjuster 328. The exponent adjuster 328 is set to add the value of the carry signal to the sum of the most significant bits of the integer operands received from the first multiplexer 310. In one embodiment, the integer mode uses control signals to alter features of the floating-point adder 300 of FIG. 3 as described above to perform integer operations. In one embodiment, the floating-point adder 300 is not pipelined.

In another embodiment, the floating-point adder 300 is pipelined. In an example embodiment of a pipelined floating-point adder 300, a first stage of the pipeline 330 comprises the logic for comparing the exponents. A second stage of the pipeline 332 comprises the logic for selecting and shifting a co-efficient. A third stage of the pipeline 334 comprises the logic for adding the co-efficients. In the pipelined floating-point adder 300 the control signals for altering features of the floating-point adder 300 for the integer mode move through the pipeline stages with the operands.

In an example embodiments shown in both FIG. 3, the floating-point adder 300 accepts both scalar operations and vector operations. The floating-point adder 300 performs both signed or unsigned integer arithmetic operations. For both floating-point and integer operands, floating-point adder 300 performs the complete set of compare operations mandated by the IEEE floating-point standard. The compare operations include: equal, not equal, greater than, greater than or equal, less than, and less than or equal.

Alternate embodiments having additional or differing combinations of hardware will be readily apparent to one skilled in the art and are contemplated as within the scope of the invention. For example, a carry bit from the least significant bits of the integer result can be added to the most significant bits of the integer result using any component of a floating-point adder capable of incrementing or adding one to a value.

Execution of Integer Operations. An example embodiment of a floating 25 point adder performing both floating-point and integer operations has been described by reference to FIG. 3. The execution of integer operations utilizing the integer mode of the example floating-point adder is described below. An integer operation starts when an integer add, subtract or compare instruction is received for execution by a processor, such as the processor 118 of FIG. 1.

Exponent comparator 308 receives a signal representing the value of the most significant bits of each one of the integer operands. Because the comparator 308 performs a subtract operation on the most significant bits, the complement logic 320 complements the most significant bits of the operand in the subtrahend position before the signal is received by the comparator 308. The exponent comparator 308 has two outputs. The first output signal of the exponent comparator 308 represents the sum of the most significant bits of the first and the second integer operands. The sum represents a partial result of the add operation being performed by the floatingpoint adder 300. A value of a carry bit from the sum of the least significant bits of the integer result is later added to the sum of the most significant bits.

A second output signal of the exponent comparator 308 represents the carry bit (referred to herein as "the compare result") from the compare operation. During a floating-point operation the compare result is used to select a co-efficient of one of the operands to be shifted. However, during an integer operation the operand is not shifted, so the value on the second output of exponent comparator 308 is ignored (i.e. a don't care condition).

A second multiplexer 312 selects the least significant bits of one of the integer operands to pass through the first shifter 316. The integer mode indicates which of the operand inputs to the second multiplexer 312 is to be applied to the output of the second multiplexer 312. In contrast, during a floating point operation, the operand selected by the second multiplexer 312 is indicated by the compare result signal from the exponent comparator 308.

A third multiplexer 314 selects the least significant bits of the opposite one of the integer operands. The integer mode indicates which of the operand inputs to the third multiplexer 314 is to be applied to the output of the third multiplexer 314.

In contrast, during a floating point operation, the operand selected by the third multiplexer 314 is indicated by an inverted compare result signal from the exponent comparator 308.

The first shifter 316 receives the output of the second multiplexer 312 on a first input. The signal on the output of the second multiplexer 312 represents the least significant bits of one of the integer operands. During integer mode, the least significant bits of one of the integer operands pass through the first shifter 316 with a zero shift. In other words, the least significant bits of one of the integer operands pass through the first shifter 316 without being shifted. In contrast, during the floating-point operation the co-efficient of one of the floating-point operands is frequently shifted and the exponent adjusted so that the exponents of each one of the operands have the same value.

Adder 318 receives the output of the first shifter 316 on a first input. The signal on the first input to adder 318 represents the least significant bits of one of the integer operands. The adder 318 receives the output of the third multiplexer 314 on a second input. The signal on the second input represents the least significant bits of the second one of the integer operands to be added. Adder 318 adds the least significant bits of the integer operands. The signal on the output of the adder 318 represents the result of the add operation. The signal on the output of the adder 318 is a partial result for the operation being performed by the floating-point adder 300.

In other words, the signal on the output of adder 318 represents the least significant bits of the result of the operation being performed by the floating-point adder 300.

The first multiplexer 310 selects the sum of the least significant bits.

If the add operation performed by the adder 318 has a carry bit, the value of the carry bit is added to the low order bit of the most significant bits of the partial result of the integer operation. For example, for sixty-four (64) bit operands, the fifty-two (52) bit output of the adder 318 represents the fifty-two (52) least significant bits of the result. If the output of the adder 318 includes a "1" on the carry bit, the carry bit is added to the low order bit of the twelve (12) bit output of the exponent comparator 308. The sum of the twelve (12) bit output of the exponent comparator 308 and the carry bit of the adder 318 represents the twelve (12) most significant bits of the result. A carry bit generated from the most significant bits can either be stored or ignored.

In the floating-point adder 300 shown in FIG. 3, the carry bit from the adder 318 is coupled to the exponent adjuster 328. The exponent adjuster 328 adds the value of the carry bit to the sum of the most significant bits of the integer operands. The output of the exponent adjuster 328 represents the sum of the most significant bits of the integer operands.

The example described above is for an add instruction having integer operands. One of skill in the art will recognize that the floating-point adder 300 also executes subtract and compare instructions having integer operands. If a vector compare operation is performed, the result returned is a single bit referred to as a vector mask. The vector mask is determined by the carry bit out of the compare operation. In one embodiment, a true result returns a "1" to the vector mask and a failed result returns a "0" to the vector mask. If a scalar compare operation is performed, the result returned is either all "0" bits or all "1" bits. For example, a scalar compare operation on 64 bit operands returns either 64 "1" bits for a true result or 64 "0" bits for a failed result.

Conclusion. A floating-point adder according to the present invention performs both floating-point and integer operations. The floating-point adder desirably permits all floating-point and integer add, subtract and compare operations to be performed without adding substantial additional hardware to the ALU for the integer operations. Thus, the floating-point adder permits execution of all floating-point and integer operations utilizing one functional unit. The floating-point adder of the present invention is physically smaller and less complex than having separate paths and functional units for integer operations and floating-point operations.

Other mechanisms for implementing floating-point adders will be apparent to those skilled in the art, as will the use of alternate methods. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of executing arithmetic operations on a first and a second integer operand, each one of the integer operands having a plurality of most significant bits and a plurality of least significant bits, using a floating-point adder having exponent logic and co-efficient logic, the method comprising:

adding the most significant bits of the first integer operand to the most significant bits of the second integer operand utilizing the exponent logic to generate a first output representing the most significant bits of a result of the arithmetic operation;

adding the least significant bits of the first integer operand with the least significant bits of the second integer operand utilizing the co-efficient logic to generate a second output representing the least significant bits of the result of the arithmetic operation; and adding a carry bit from the second output to the first output.

2. The method of claim 1, wherein the arithmetic operation performed is a compare operation selected from the group consisting of: equal, not equal, greater than, greater than or equal to, less than, or less than or equal to.

3. The method of claim 1, wherein the arithmetic operation performed is an addition operation.

4. The method of claim 1, wherein the arithmetic operation performed is a subtraction operation.

5. A floating-point adder unit performing an arithmetic operation on a first integer operand and a second integer operand, each one of the integer operands having a plurality of most significant bits and a plurality of least significant bits, the floating-point adder unit comprising:

exponent logic to add the most significant bits of the first integer operand with the most significant bits of the second integer operand and to generate a first output representing the most significant bits of a result of the aritlunetic operation;

co-efficient logic to add the least significant bits of the first integer operand with the least significant bits of the second integer operand and to generate a second output representing the least significant bits of the result of the arithmetic operation; and carry logic to add a carry-out bit from the second output to the first output;

wherein the first output and the second output represent a result for the arithmetic operation.

6. The floating-point adder of claim 5, wherein the floating-point adder is pipelined.

7. The floating-point adder of claim 5, wherein the first integer operand and the second integer operand are sixty-four bit operands.

8. The floating-point adder of claim 7, wherein the co-efficient logic operates on the fifty-two least significant bits of the first integer operand and the second integer operand.

9. The floating-point adder of claim 7, wherein the exponent logic operates on the twelve most significant bits of the first integer operand and the second integer operand.

10. A system comprising:
a memory to store floating-point instructions for execution by a processor;
a bus; and
a processor operatively coupled to the memory by the bus, the processor including a floating-point adder unit to perform addition, subtraction, and compare arithmetic operations on both integer operands and floating-point operands loaded from the memory over the bus, wherein the floating-point adder includes:
  exponent logic to add most significant bits of a first integer operand with most significant bits of a second integer operand and to generate a first output representing most significant bits of a result of an integer operation;
  co-efficient logic to add least significant bits of the first integer operand with least significant bits of the second integer operand and to generate a second output representing the least significant bits of the result of the integer operation; and
  carry logic to add a carry bit from the second output to the first output and to generate a result for the arithmetic operation.

11. The system of claim 10, wherein the processor performs pipelined operations.

12. The system of claim 10, wherein the processor accepts vector operations.

13. The system of claim 10, wherein the processor accepts scalar operations.

14. The system of claim 10, wherein the processor performs signed integer operations.

15. The system of claim 10, wherein the processor performs unsigned integer operations.

16. An article comprising:
a floating-point adder unit to perform addition, subtraction, and compare arithmetic operations on both interger operands and floting-point operands, wherein the floating-point adder unit further comprises;
  exponent logic to add most significant bits of a firs interger operand with most significant bits of a second integer operand and to generate a first output representing most significant bits of a result of an interger operation;
  co-efficient logic to add least significant bits of the first interger operand with least significant bits of the second interger operand and to generate a second output representing the least significant bits of the result of the integer operation; and
  carry logic to add a carry bit from the second output to the first output and to generate a result for the arithmetic operation.

17. The article of claim 16, wherein the floating-point adder unit performs pipelined operations.

* * * * *